United States Patent
Campbell et al.

[11] Patent Number: 5,909,553
[45] Date of Patent: Jun. 1, 1999

[54] SYSTEMS AND METHODS FOR CONTROLLING THE TRANSMISSION OF RELATIVELY LARGE DATA OBJECTS IN A COMMUNICATIONS SYSTEM

[75] Inventors: Scott Allan Campbell, Cary; Lynn Douglas Long, Chapel Hill; Linwood Hugh Overby, Jr.; Bala Rajaraman, both of Raleigh, all of N.C.

[73] Assignee: International Business Machines Corporation, Armonk, N.Y.

[21] Appl. No.: 08/802,596

[22] Filed: Feb. 19, 1997

[51] Int. Cl.$^6$ .................................................. G06F 13/14
[52] U.S. Cl. ...................................................... 395/200.66
[58] Field of Search .................... 364/DIG. 1, DIG. 7; 395/200.3, 200.43, 200.48, 200.61, 200.64, 200.65, 200.66, 200.68

[56] References Cited

U.S. PATENT DOCUMENTS

| | | |
|---|---|---|
| 4,365,295 | 12/1982 | Katzman et al. . |
| 4,586,134 | 4/1986 | Norstedt . |
| 4,926,322 | 5/1990 | Stimac et al. . |
| 5,027,269 | 6/1991 | Grant et al. . |
| 5,269,013 | 12/1993 | Abramson et al. . |
| 5,278,834 | 1/1994 | Mazzola . |
| 5,297,265 | 3/1994 | Frank et al. . |
| 5,386,536 | 1/1995 | Courts et al. . |
| 5,396,614 | 3/1995 | Khalidi et al. . |

*Primary Examiner*—Robert B. Harrell
*Attorney, Agent, or Firm*—Jerry W. Herndon

[57] ABSTRACT

Transmission control improves the performance in a communications system relating to transferring large data objects between domains or applications. This reduces or eliminates data movement between domains by transferring ownership of the "container" containing the data as opposed to moving the contents of the container from one domain to another domain resulting in copying the large data object. Thus, transmission control provides for control of the transmission of relatively large data objects between domains in a communications system which otherwise only allows efficient transmission of relatively small data objects between domains in a communications system. Tokens are assigned and associated with buffers containing the data to be shared. The token is not an address, but rather an identifier for the buffer which can be transferred from one domain to a second domain without requiring the copying of the data. The domain which originally requests the buffer is assigned a primary token and secondary tokens are assigned to each subsequent domain which also requests access to the buffer.

36 Claims, 13 Drawing Sheets

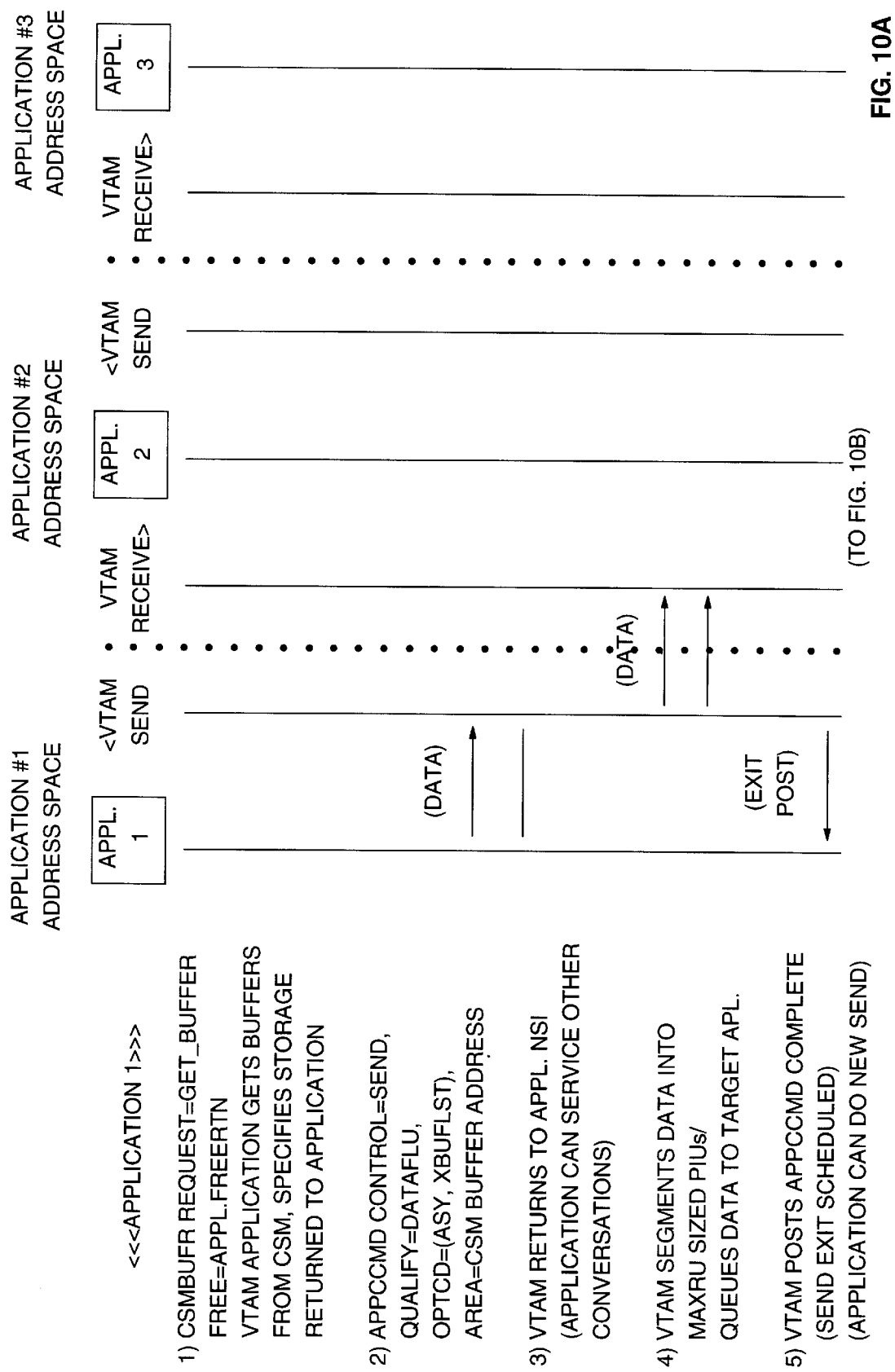

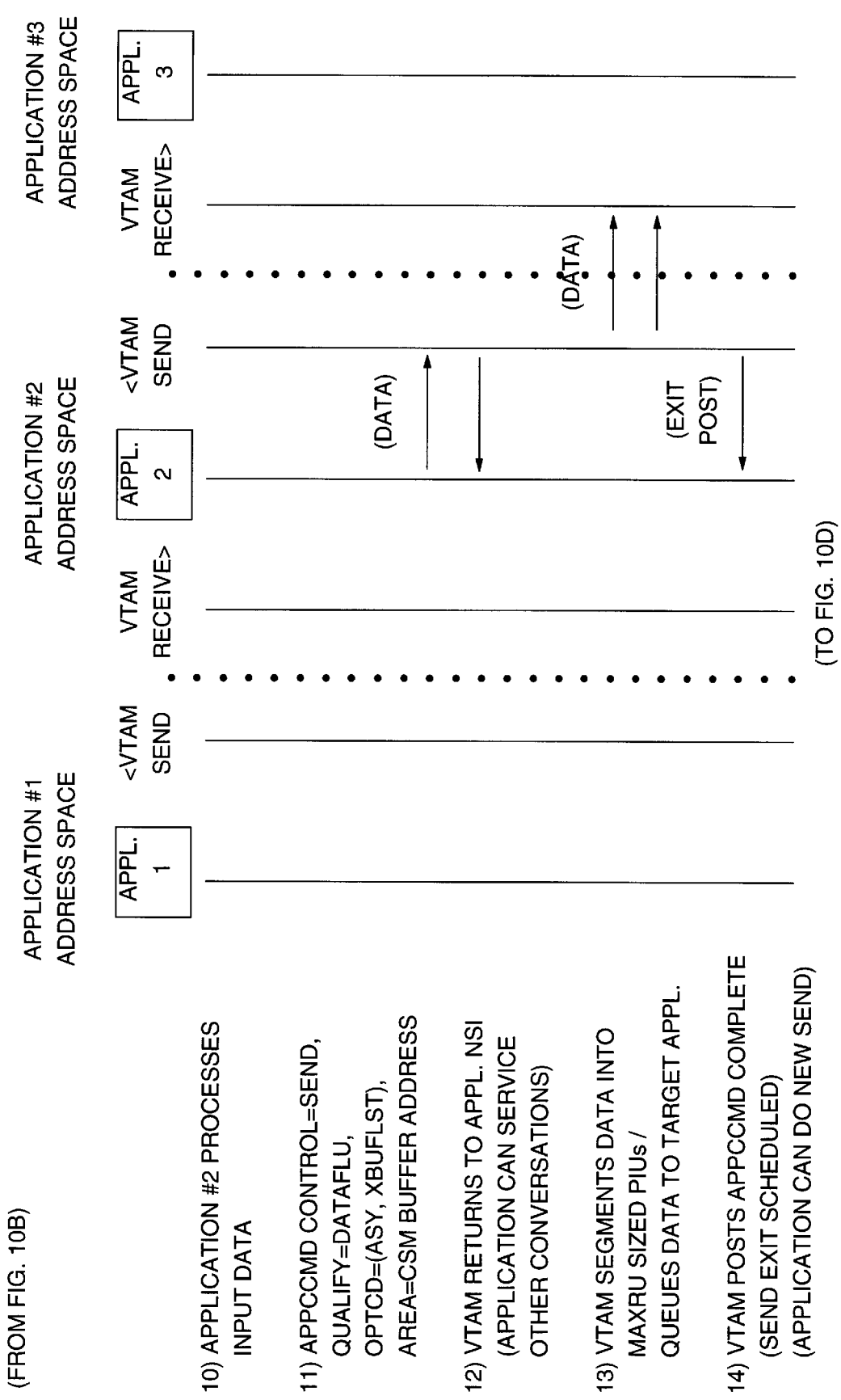

SYSTEMS AND METHODS FOR CONTROLLING THE TRANSMISSION OF RELATIVELY LARGE DATA OBJECTS IN A COMMUNICATIONS SYSTEM

FIELD OF THE INVENTION

This invention relates to data communications, and more particularly, to sharing of data and transmission of data in a communications system. Even more particularly, the invention relates to a system for controlling transmission of relatively large quantities of data between applications programs in a communications stack in a communications system.

BACKGROUND OF THE INVENTION

A communications system or network may be generally defined as a collection of computers or computing systems which interact and transmit data from one computer (i.e., node) on the network to another. The functional capabilities of the nodes may range from terminals with minimal local processing capability to complex multiprocessors capable of high speed local processing. A node incorporates a set of control functions required to ensure that network interfaces comply with networking standards or architectures. These control functions may be grouped into sets based on function. For example, in the Systems Network Architecture ("SNA") developed by International Business Machines Corporation ("IBM"), the assignee of the present invention, SNA defines a Physical Unit ("PU"), which controls operation of real network resources such as links, and a Logical Unit ("LU") which controls logical software based entities such as applications. Other networking architectures define similar functional groupings.

The communications facilities which interconnect the nodes also may vary, ranging from high speed input/output ("I/O") channels to low speed, point-to-point telephone lines. By way of example, the media used to implement the communications facilities may include satellite links or wide band optical fibers.

Referring to FIG. 1, a high level block diagram illustrating the components of an application-to-application communications network with two nodes, in this case, host computers, in a direct-attach environment is illustrated at 10. This type of view of the application-to-application communications network is sometimes referred to as an "end-to-end" view. The two host computers are illustrated at 12 and 14, respectively. The host computers, for example, may be IBM 390 Mainframe computers manufactured by International Business Machines Corporation ("IBM"), the assignee of the present invention. Each host computer has an "outbound" side 16 for sending data across the network and an "inbound" side 18 for receiving data transmitted across the network. In addition, applications execute on the host computers as illustrated at 20 and 22. Once an application has processed data and requests that data is to be sent to another node on the network, the data to be transmitted is then processed in the communications stacks 24 and 26 at the node on which the application is executing and transmitted via the system input/output ("I/O") interface 28. System I/O interface 28 also serves to assist in the receiving of data transmitted across the network.

By way of example, the present invention may also function in the communications network environment similar to that illustrated at 10' in FIG. 2. In the communications network illustrated in FIG. 2, two host computers are illustrated at 50 and 52. Host computer 50 as illustrated has the capability for managing relatively large data objects in a communications stack in accordance with the present invention. Computer 54 is a controller which simply is used as a route in the network for routing data which has been processed for transmission by host computer 50 across network 60. Applications execute on host computer 50 as illustrated at 62. Once an application has processed data and requests the data to be sent to another node on the network, the data to be transmitted is then processed in the communications stack 64.

Communications across a communications system such as that illustrated in FIG. 1 or 2 may be controlled by a network architecture. One network architecture which may be implemented on a communications system such as that illustrated in FIG. 1 or 2 is the Systems Network Architecture ("SNA") developed by IBM, the assignee of the present invention. SNA is a network architecture intended to allow users to construct their own private network on a communications system. An SNA network may be defined as a collection of machines or computers (i.e., nodes). There are several different types of nodes in an SNA network, including terminals, controllers that supervise the behavior of terminals and other peripherals, front-end processors which relieve the main central processing unit of the work and interrupt handling associated with data communications, and the main host computers. In essence, SNA specifies how nodes connect and communicate with one another. Moreover, SNA enables the system to share network resources by avoiding the necessity to install separate communication links for different types of workstations or dissimilar applications, and reducing the number of programs and devices.

The functions of the communications stack in an SNA network may be organized into several layers. Referring to FIG. 3, one manner of illustrating the hierarchial layers of SNA at a given node on a communications system implementing the SNA architecture (i.e., the communications stack) is shown generally at 100. Each node in the communications network operating under the SNA architecture generally has the same hierarchial software structure so as to enable communications between the nodes. In the illustration shown in FIG. 3, these layers of the communications stack include the physical control layer 102 which connects adjacent nodes physically and electrically for physically transporting bits from one machine to another, the data link control layer 104 which constructs frames from the raw bit stream for transmitting data between adjacent nodes and detecting and recovering from transmission errors in a way transparent to higher layers, the path control layer 106 (sometimes referred to as the network layer) which routes data between source and destination nodes and controls data traffic in the network, and the transmission control layer 108 (sometimes referred to as the transport layer) which creates, manages and deletes transport connections (i.e., sessions). The SNA layers also include the data flow control layer 110 (sometimes referred to as the session layer) which synchronizes data flow between end points of a session so as to establish and control a session between two end users for conversation purposes, the presentation services layer 112 which formats data for different presentation media and coordinates the sharing of resources, the transaction services layer 114 which provides application services such as distributed database access and document interchange, and finally, the network user or application layer 116 which relates to the conversation per se between two end users.

The physical control 102, data link control 104, path control 106 and transmission control 108 layers may be referred to as the "lower" layers 120 of the SNA model as it relates to the Open Systems Interface Reference Model ("OSI"). The data flow control 110, presentation services 112 and transaction services 114 layers may be referred to as the "upper" layers 122 of the architecture. Finally, the combination of the upper layers 122 and the lower layers 120 may be viewed as the communications stack 124.

The access methods which reside on the host processors provide a source of control for an SNA network. One such access method is the Virtual Telecommunications Access Method ("VTAM") which provides the interface between applications programs and a host processor and other resources in an SNA network. In essence, VTAM is a program that controls communication between terminals and application programs, and between applications, within the same or different SNA nodes. Communication between VTAM applications programs and the host and network terminals can generally occur only through VTAM. VTAM also monitors the performance of a network, identifies locations for potential problems, and assists in recovery from network failures. VTAM runs under the control of a virtual operating system such as the Multiple Virtual Storage ("MVS"), Virtual Machine/System Product ("VM/SP"), and Virtual Storage Extended ("VSE") operating systems. When operating in the MVS environment, VTAM enables independent SNA networks to communicate with each other.

VTAM application programs run under control of the operating system similar to any other programs. However, a VTAM applications program is generally connected to VTAM before it communicates with terminals or other applications in the network. A VTAM applications program uses VTAM macro instructions to communicate with terminals. An applications program within a host processor can be used at any location in the network without the program having any awareness of the organization of the network. VTAM provides the following major functions: starting and stopping the network; dynamically changing the configuration of the network; allocation of network resources; and control of input/output processing.

Referring to FIG. 4, the major components of a communications system 200 operating under VTAM including the host computer 202 containing VTAM 206 and VTAM applications programs 204 are illustrated. The host computer 202 is connected to secondary storage (i.e., auxiliary storage) 208 as well as the telecommunications network 210. The telecommunications network 210 may be divided into the SNA Terminal Environment 212 and Local 3270, BSC and Start/Stop Terminal Environment 214. In particular, the host computer is connected to the local computers and terminals such as a Local 3790 terminal 216 and a Local 3270 terminal 218. In addition, VTAM is also connected to the local communications controller 220 which may be referred to as NCP which in turn is connected to remote communications controllers 222, terminals on switched lines 224 and terminals on nonswitched lines 226.

The SNA network architecture and VTAM are described in detail in "Systems Network Architecture," Concepts and Products, IBM, GC30-3072-3, "-JTAM Concepts," Independent Study Program, IBM, 1982; and Chapter 1 of the textbook entitled "Computer Networks" by Tanenbaum, Prentice Hall, Inc. (2d ed., 1988), all of which are incorporated herein by reference. VTAM also is described in detail in U.S. Pat. No. 4,586,134 entitled "Computer Network Systems and Its Use for Information Unit Transmission" and U.S. Pat. No. 5,027,269 entitled "Method and Apparatus for Providing Continuous Availability of Applications in a Computer Network," both of which are also incorporated herein by reference.

The movement of data in most communications systems can have a severe impact on the efficiency of the system. As the number and frequency of data transmissions increase, the utilization of components, such as a memory bus and central processing unit, of a processor significantly increase. The total throughput supported by the communications system may be severely limited when the inefficient use of a component causes the utilization of that component to reach maximum capacity.

Notwithstanding the effect of data transmissions on system performance, the current trend is towards transmission of large data objects. This occurs particularly in applications relating to multimedia, image and large file applications processing. In multimedia applications, the large data objects are broadcasted, and as a result are replicated many times. The large number of replications generally requires making multiple copies of the data which in turn generally requires numerous movements of the data between domains of storage ownership in a communications stack. As a result, the numerous movements of data may severely impact the performance in communications networks. In order to improve communications systems performance for applications such as multimedia applications which process and transmit large data objects, data movement in the data transfer execution path between domains on the same node should be eliminated, or at least significantly reduced. This amounts to addressing several problems in a communications protocol implementation, the problems including storage ownership, resource sharing and header management.

SUMMARY OF THE INVENTION

It is, therefore, an object of the present invention to provide methods, systems and computer program products for controlling the transmission of relatively large data objects in a communications system for improving the performance of a communications system.

It is another object of the present invention to provide methods, systems and computer program products for transmitting large data objects between domains in a communications system whose performance is optimized only for the transmission of relatively small data objects between the domains.

These and other objects are provided according to the present invention by a system for improving the performance in a communications system relating to transferring large data objects between domains. The invention is described in an environment which is substantially based upon the IBM SNA architecture and VTAM access method. In the SNA architecture environment, each layer 102-116 of the SNA network communicates directly with the tokenized shared storage manager 130 of the present invention as illustrated generally at 100' in FIG. 5. Notwithstanding the above, the invention is applicable to any type of network which allows only efficient transmission of relatively small data objects between domains.

Transfer of data between domains is accomplished by providing a "container" to support the transfer of data between domains. In order to reduce or eliminate data movement between domains, the present invention is directed to the transfer of ownership of the "container" as opposed to moving the contents of the container from one container in one domain to a different container in another domain. The present invention stems from the understanding that in order for data to be transferred from one domain to the next, it is passed between domains using a defined interface, and if the moving or copying of data can be eliminated, performance can be enhanced.

Thus, transmission control according to the present invention controls the transmission of relatively large data objects between domains in a communications system which otherwise only allows efficient transmission of relatively small data objects between the domains. Transmission control according to the present invention comprises buffers for storing relatively large data objects, domains which represent applications capable of processing data in a communications system and ownership control means for assigning ownership of a first buffer having a relatively large data object stored therein to a first domain and for transferring ownership of the first buffer having the relatively large data object stored therein from the first domain to the second domain without moving the relatively large data object (i.e., without moving the contents of the buffer) from the first domain to the second domain.

The ownership controller comprises a primary token for representing the first buffer and a secondary token for representing a first logical view of the first buffer. The system according to the present invention also comprises a storage manager which uniquely associates the first buffer with the first domain, uniquely associates the first secondary token with the first buffer identified by the first primary token, and uniquely associates the first secondary token with the second domain.

The transmission controlling system also comprises a second secondary token which represents a second logical view of the first buffer. The storage manager also associates the second secondary token with the first buffer identified by the first primary token, and associates the second secondary token with a third domain so that relatively large data objects stored in the first buffer can be passed from the second domain to the third domain without physically moving the data (i.e., without physically moving the contents of the buffer from the second domain to the third domain).

The tokens are used to represent each buffer in a pool of buffers. The tokens are not physical addresses of the buffer, but rather are identifications of the buffer so that when an applications program or domain requests a buffer or refers to a buffer, the applications program or domain, or even the storage manager, can refer to the buffer by the token as opposed to the physical address. In other words, the token is used to refer to the buffer when it is not necessary to "touch" the buffer (i.e., when the contents of the buffer are to be read or data is to be written to the buffer). The token is the basis for determining which domain is the current owner of the buffer. Upon completion of processing by each domain which has either a primary or secondary token associated with the buffer, the buffer is released or reallocated and returned to the buffer pool.

In an alternative embodiment, the ownership of the buffer may be returned to the original owner upon completion of processing of the buffer by all domains having either a primary or secondary token associated with the buffer.

BRIEF DESCRIPTION OF THE DRAWINGS

FIG. 10A, 10B, 10C, and 10D is a control flow table illustrating an example in which ownership of buffers is passed between three applications and returned to Application 1, the application originally requesting the ownership of the buffer.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
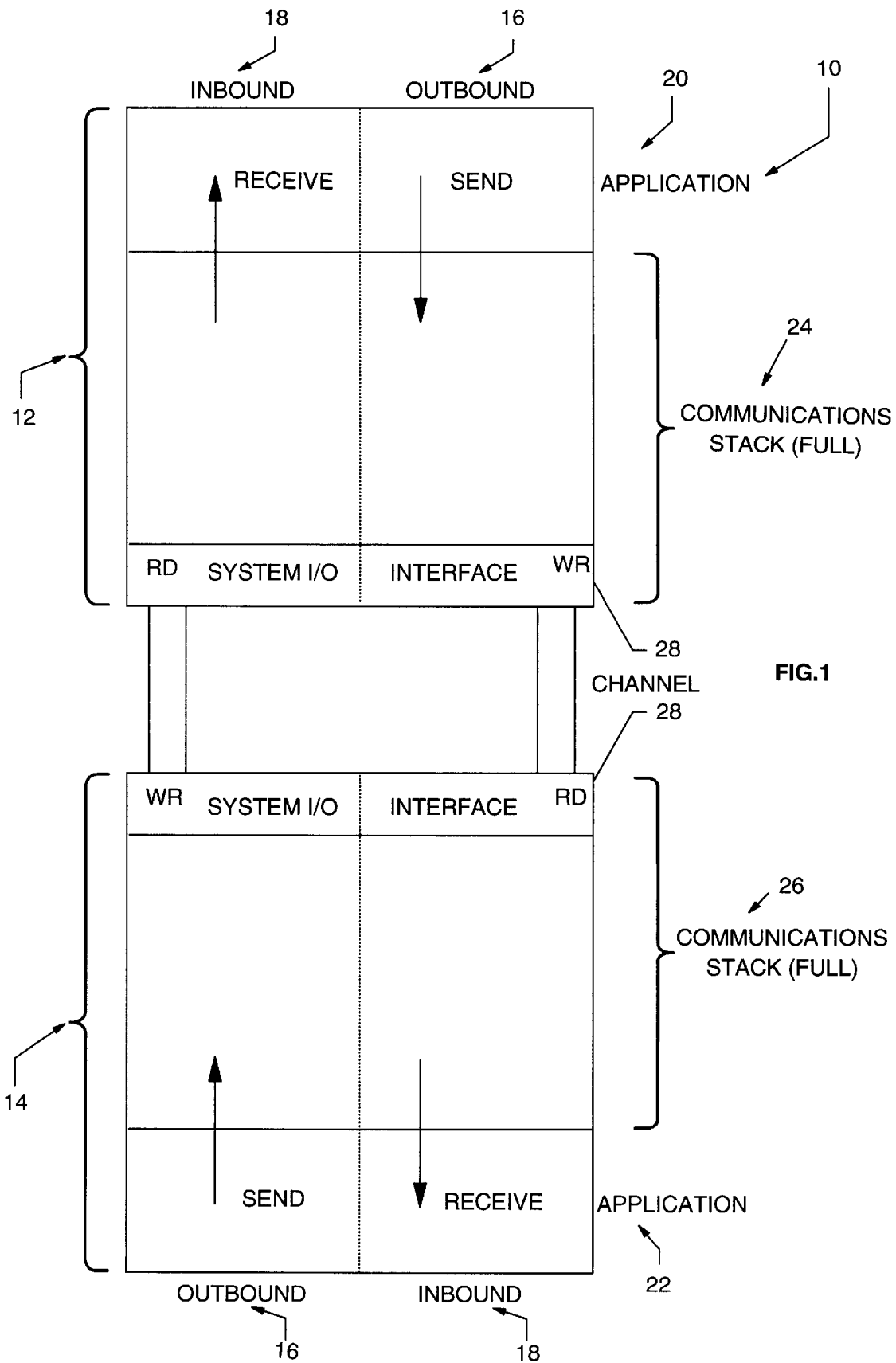
FIG. 1 is a block diagram of an application-to-application communications network with two host computers in a direct-attached environment.
Figure 2:
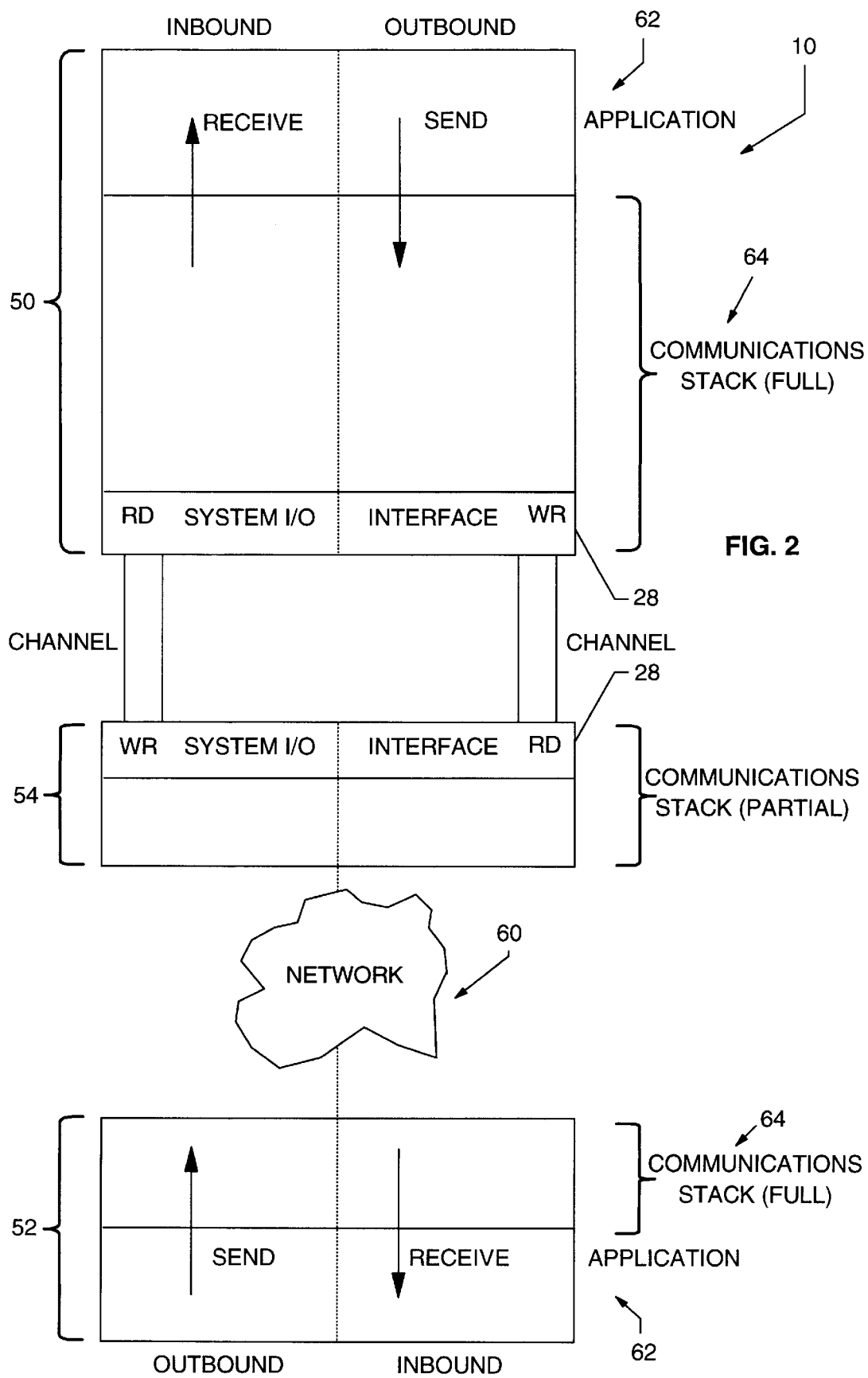
FIG. 2 is a block diagram illustrating the components of an application-to-application communications network with two host computers and a network controller.
Figure 3:
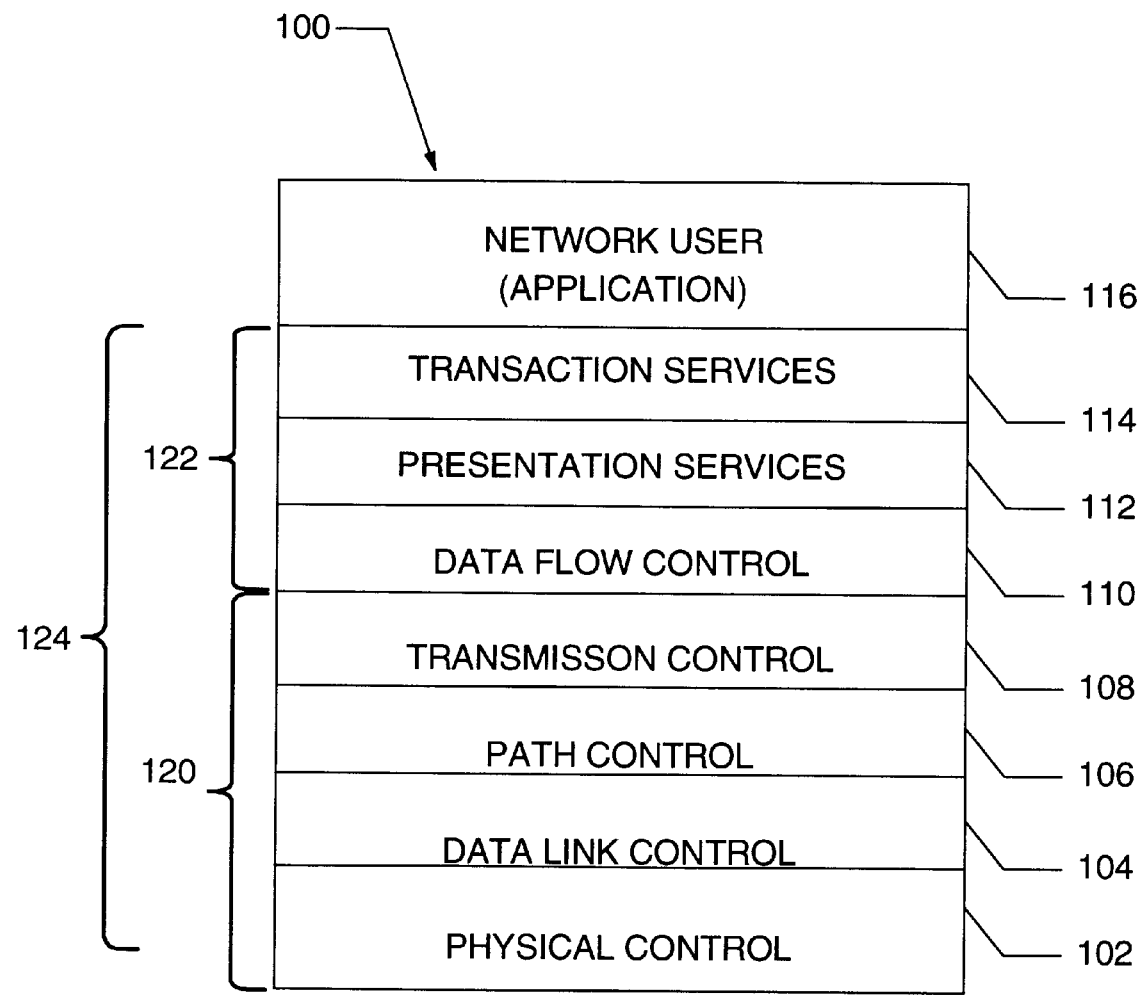
FIG. 3 is a schematic block diagram illustrating the network protocol layers from a computer software perspective for the System Network Architecture implementation of a communications system at a particular node.
Figure 4:
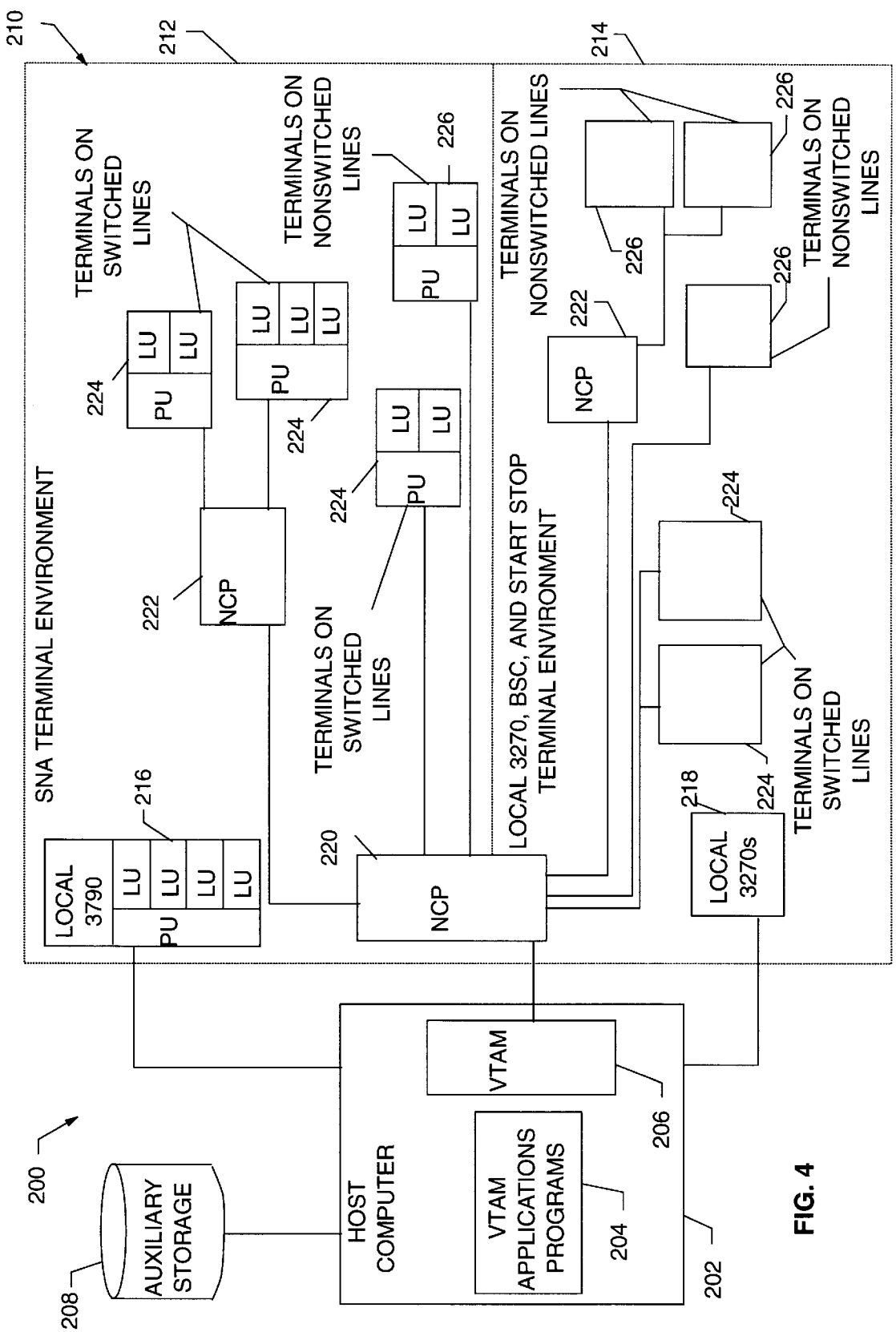
FIG. 4 is a block diagram of the major components of a VTAM system for a communications system capable of implementing he SNA architecture illustrated in FIG. 1.
Figure 5:
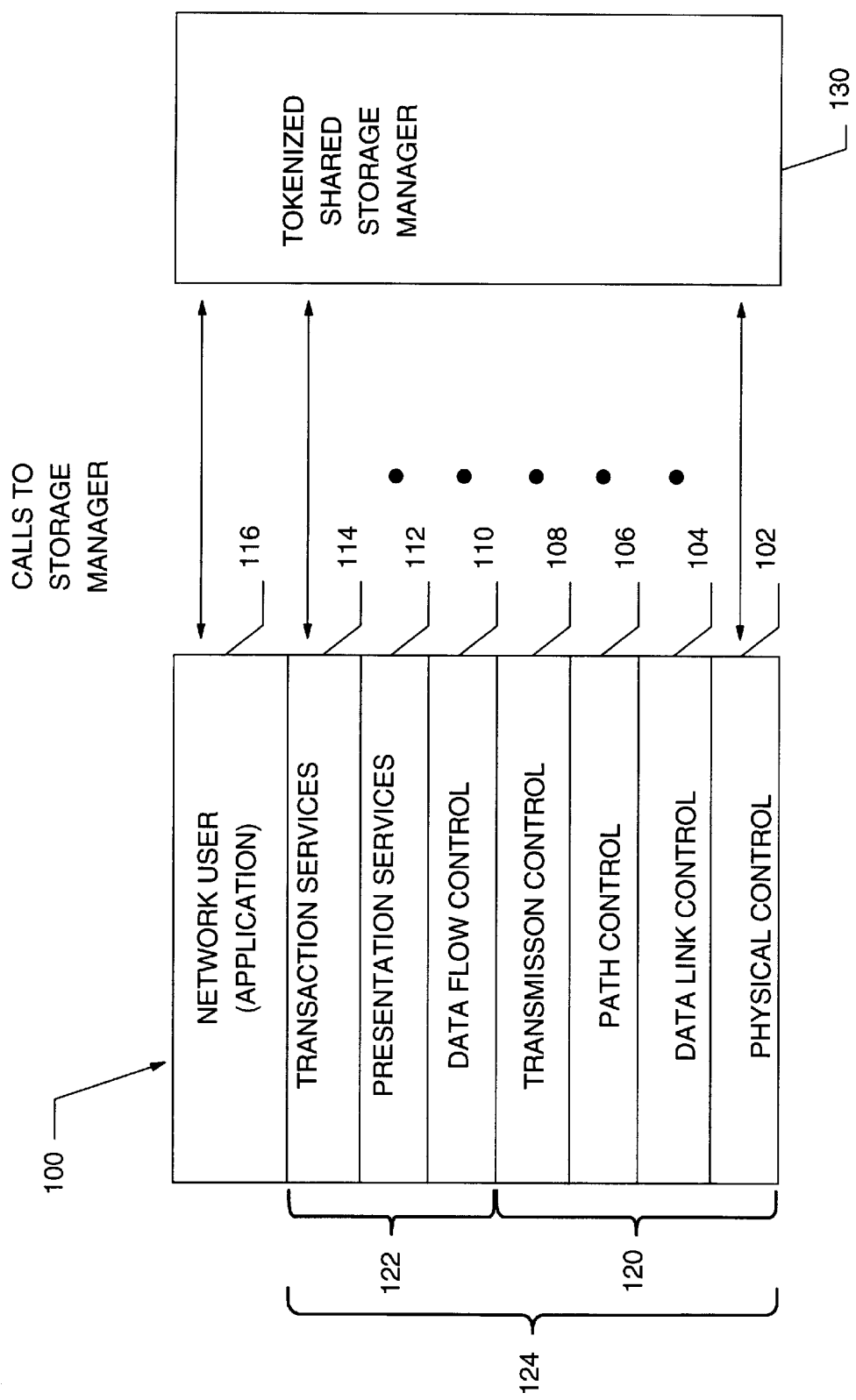
FIG. 5 is a schematic block diagram illustrating the network protocol layers from a computer software perspective for the SNA architecture in communications with the tokenized shared storage manager according to the present invention.
Figure 6:
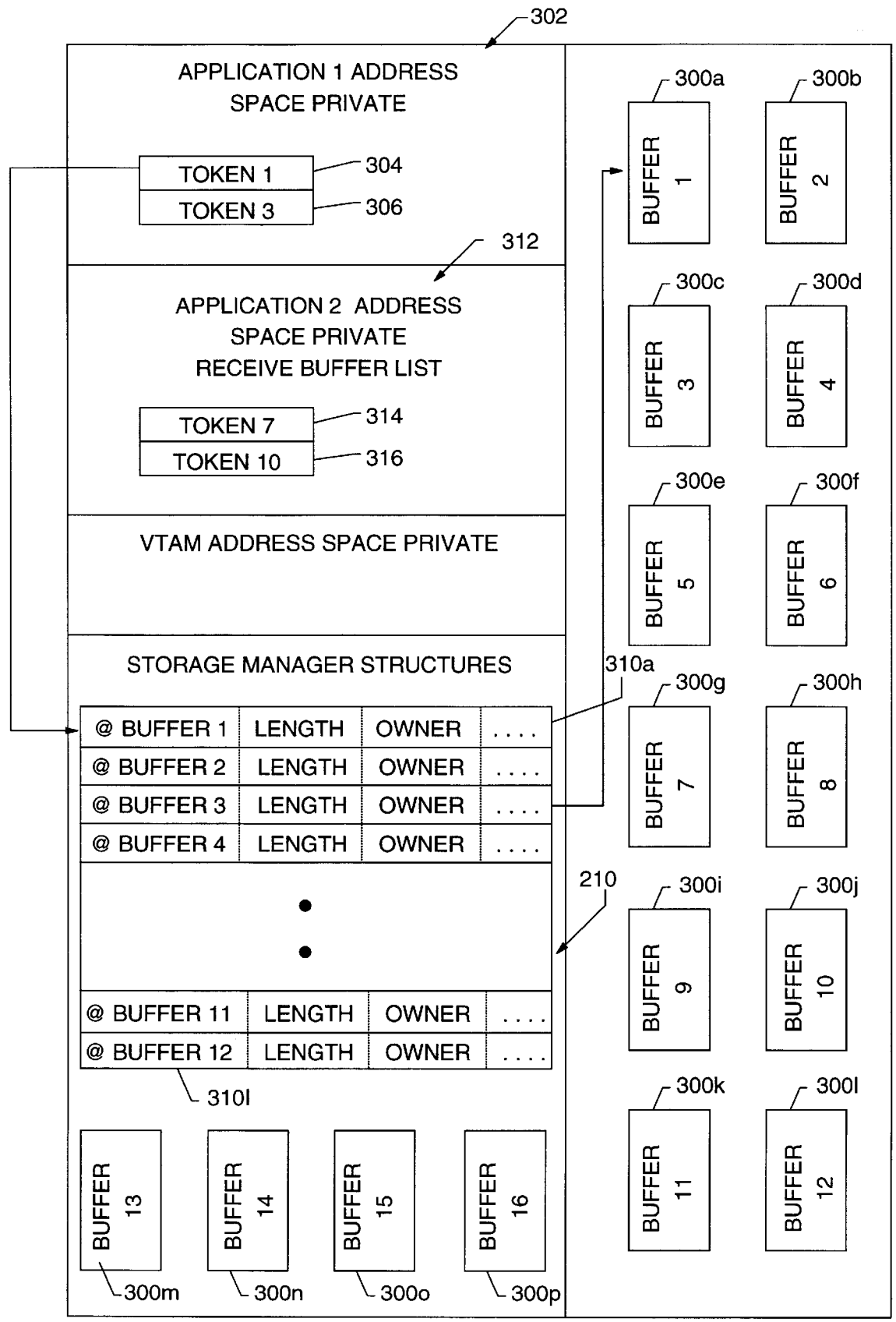
FIG. 6 is a block diagram illustrating the relationship between tokens, storage manager structures and buffers.

Referring to FIG. 6, a block diagram illustrating the relationship between tokens, storage manager structures and buffers is illustrated. Buffers 1–12 300a–300l are containers having data stored therein for use by applications programs or domains. When these buffers are not owned by a particular domain, they are located in a pool of available buffers. In the example illustrated in FIG. 6, buffers 13–16 300m–300p are in the pool of available buffers. These buffers may have different sizes such as 32K or 60K bytes of storage capacity. A domain, when requesting a buffer, may request a buffer of a specific size. The type and buffer size is selected by the requesting domain based on how the data will be shared and the required method of access.

The storage manager 130 will provide a tokenized mapping to a buffer from the pool of available buffers for the requested size. The token is used to represent a buffer in the buffer pool. The token acts as an identification so that when the buffer is requested, a token is returned which permits the domain to refer to the token during processing without "touching" the actual buffer, which may require resolving the address of the buffer. A buffer is "touched" when data is read from a buffer or data is written to a buffer. Otherwise, if the buffer is not being read from or being written to, the present invention avoids "touching" the buffer and, instead, references the buffer using a token. The token can be used to reference the buffer when passing data between domains in a communications stack, thus passing ownership of the buffer and not the contents of the buffer. As a result, unnecessary copying of data, which otherwise takes place when data is passed between domains, may be avoided. Thus, the domains and the storage manager can reference the buffers without actually "touching" the storage which requires resolution of the address.

The storage manager provides structures for each token. The storage manager structures include information relating to the address of the buffer, the length of the buffer, the owner of the storage, and an indication as to whether the buffer is free (i.e., in the pool of available buffers), or is in use and presently has a token assigned to it. Separate storage manager structures are provided for each primary and each secondary token. The storage manager structures for the buffers may be viewed as a table of structures.

The token itself may be an address, it may be the combination of two other tokens, or any other identifier for referencing a buffer which is not an address. The token allows the storage manager to resolve the address of the buffer using the control structure. As noted above, the control structure has, among other information, the address of the buffer stored therein. In addition, more than one token may point to a single buffer. As a result, since each token is uniquely identified with a storage manager structure, more than one storage manager structure may point to a single buffer.

Referring again to FIG. 6, an example of the ownership of buffers will be described. Application 1 ("Appl 1") as indicated at 302 in FIG. 6 requested buffers for storage of data being processed by Appl 1. In the example shown in FIG. 6, Appl 1 has two buffers which have been assigned Token 1 304 and Token 3 306, respectively. Token 1 references the storage management structure 310 and particularly the storage management structure 310a which is the storage management structure for the buffer identified by Token 1. Storage management structure 310a contains various storage administration information, including an address pointing to Buffer 1 300a, the length of Buffer 1 300a, and the identity of the owner of Buffer 1 300a, in the example illustrated in FIG. 6.

Application 2 ("Appl 2") has its own address space which is private to Appl 2 at 312. This space maintains the tokens used by Appl 2 to refer to the buffers which it owns. In this example, Appl 2 has Token 7 314 and Token 10 316. Finally, VTAM also has address space associated with VTAM which is private to VTAM and not accessible by any application.

FIGS. 6–9 and 10A–10D are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Figure 7:
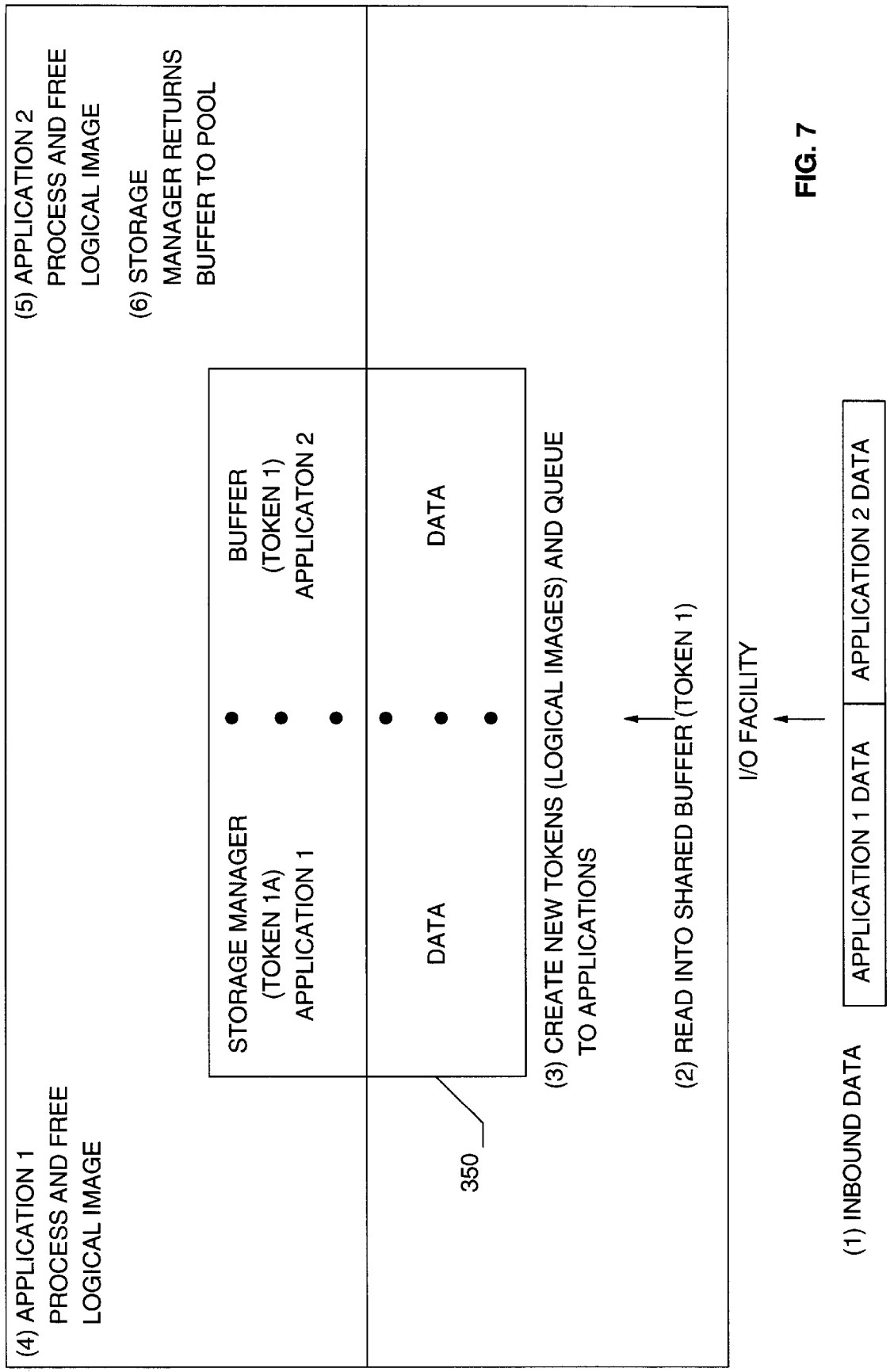
FIG. 7 is a block diagram illustrating the operations for controlling transmission of data between applications on one node by sharing buffers using tokens.

Referring to FIG. 7, a block diagram of the operation of the present invention for controlling transmission of data between applications or domains in a communications stack on one node by sharing buffers using tokens is illustrated. In the example illustrated in FIG. 7, both Application 1 ("Appl 1") and Application 2 ("Appl 2") have data which is received at the node for use by Appl 1 and Appl 2 as indicated at Step 1 by "in-bound data." "In-bound data" refers to data which is received from another node in the network. In FIG. 7, the in-bound data is read into a shared buffer and assigned Token 1 at Step 2. Next, new tokens (i.e., logical images) of the shared buffer are created and queued to Appl 1 and Appl 2 at Step 3. The communications stack is illustrated in FIG. 7 at 350. The communications stack includes the storage manager having assigned Token 1A to Appl 1 and Token 1 to Appl 2.

Appl 1 then processes the data stored in the buffer identified by Token 1A and upon completion of the processing of the data frees the logical image of the data at Step 4 (i.e., frees the token upon completion of the processing of the data). Ownership of the shared buffer is then transferred to Appl 2. The shared buffer is referred to by Appl 2 using Token 1. Appl 2 processes the data referred to by Token 1 and upon completion of the processing of the data referred to by Token 1, also frees the logical image of the data in the shared buffer in Step 5. Upon completion of the freeing of the logical images of the data (i.e., there being no more tokens associated with the shared buffer), the storage manager returns the buffer to the pool of available buffers at Step 6.

Figure 8:
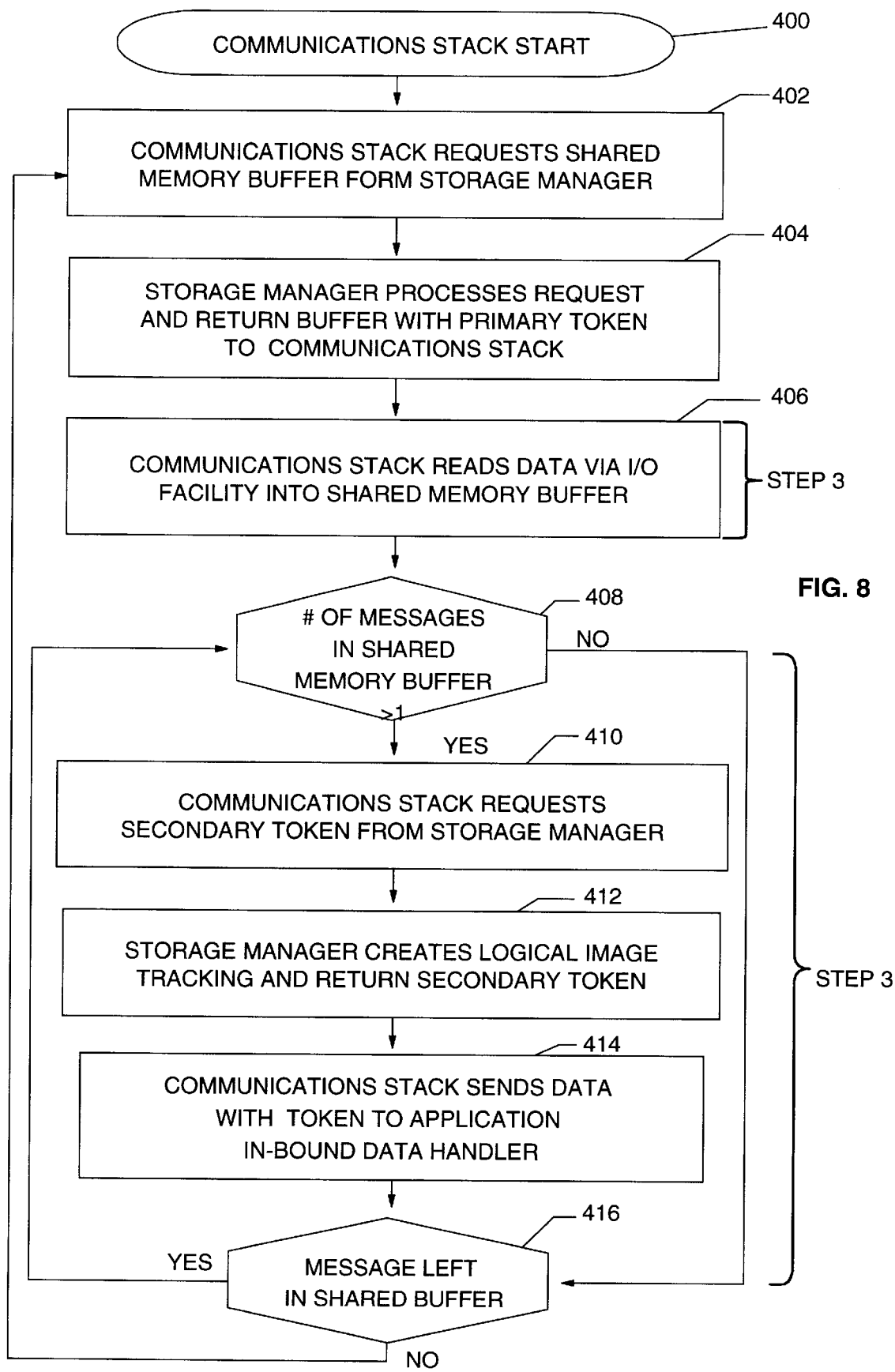
FIG. 8 is a flowchart representation illustrating the operations relating to control of the communications stack for controlling the transmission of data through sharing buffers using tokens.

Referring to FIG. 8, a flowchart of the operations relating to control of the communications stack for controlling the transmission of the data between domains through sharing buffers using tokens is illustrated. In summary, FIG. 8 illustrates the ability to share a buffer among multiple domains by providing a function to create secondary tokens which map to the same buffer as the primary token. Each token provides a logical view of the buffer and can be used independent of the other tokens representing the same buffer. The storage manager keeps track of the number of logical views of each buffer and the owning domain of each buffer. This allows each domain to use the data in the buffer and, when finished, free the token representing its logical view. The shared buffer is not considered available for reallocation (i.e., returned to the pool of available buffers) until all tokens representing logical views of the shared buffer have been freed. As a result, the present invention allows data received at a node in the communications system and stored in a buffer to be passed to all applications for which data was received without physically moving the data from the buffer to a unique storage area for each application. To pass data contained in a buffer from one application or domain to a second application or domain simply requires the creation of a new token (i.e., logical image) for the data and the buffer as opposed to making numerous copies of the data.

The communications stack starts processing at 400 in FIG. 8. Thereafter, the communications stack requests a shared memory buffer from the storage manager at 402. The storage manager processes the request for a shared memory buffer by the communications stack and returns a buffer from the pool of available buffers with a primary token associated therewith to the communications stack at 404. The communications stack then reads data via the Input/Output ("I/O") facility into the shared memory buffer at 406. Step 406 relating to reading the data via the I/O facility into the shared memory buffer corresponds to Step 2 of FIG. 7.

Referring again to FIG. 8, the communications stack determines at 408 whether the number of messages in the shared memory buffer is greater than 1. If it is determined that the number of messages in the shared memory buffer is greater than 1, the communications stack requests a secondary token from the storage manager at 410. The storage manager, in response to the request from the communications stack, creates a logical image and returns a secondary token to the communications stack at 412. The communications stack then sends the data with the secondary token to the application in-bound data handler routine at 414 for processing of the data.

If it is determined at 408 that the number of messages in the shared memory buffer is not greater than 1 (i.e., there is only one message in the shared memory buffer), then control is transferred to 414 and the communications stack sends data with the primary token to the application in-bound data handler routine which will be described with respect to FIG. 9.

The steps of the flowchart illustrated in FIG. 8 identified at 408, 410, 412 and 414 correspond to Step 3 of the block diagram of FIG. 7.

Thereafter, the communications stack determines at 416 whether any messages are left in the shared buffer. If the communications stack determines that there are messages left in the shared buffer, control is returned to 408 to determine how many messages remain in the shared buffer. If the communications stack determines at 416 that no messages are left in the shared buffer, control is returned to 402 for the communications stack to request a shared memory buffer from the storage manager.

Figure 9:
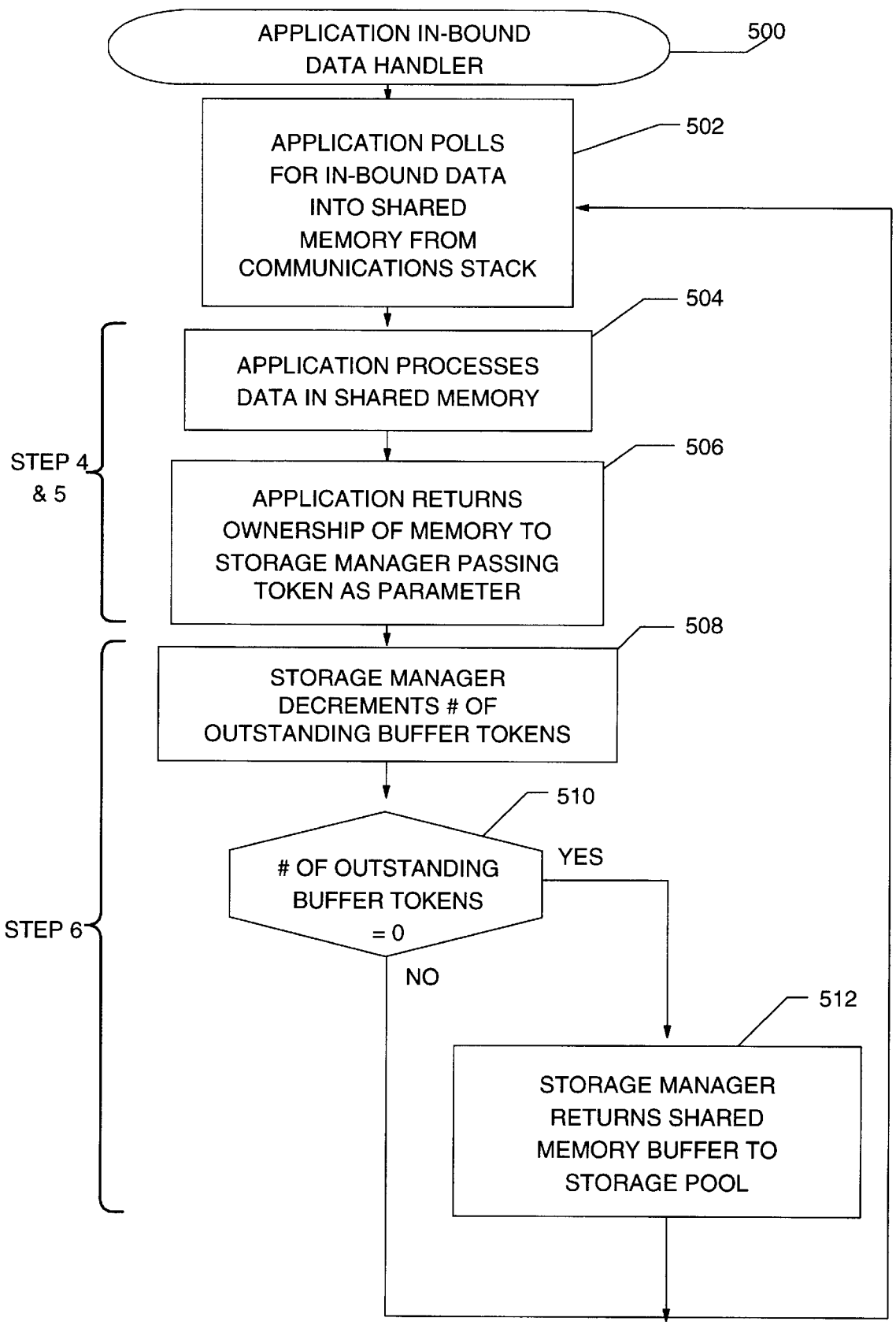
FIG. 9 is a flowchart representation illustrating operation of an application process large data objects using tokens.
Figure 10B:
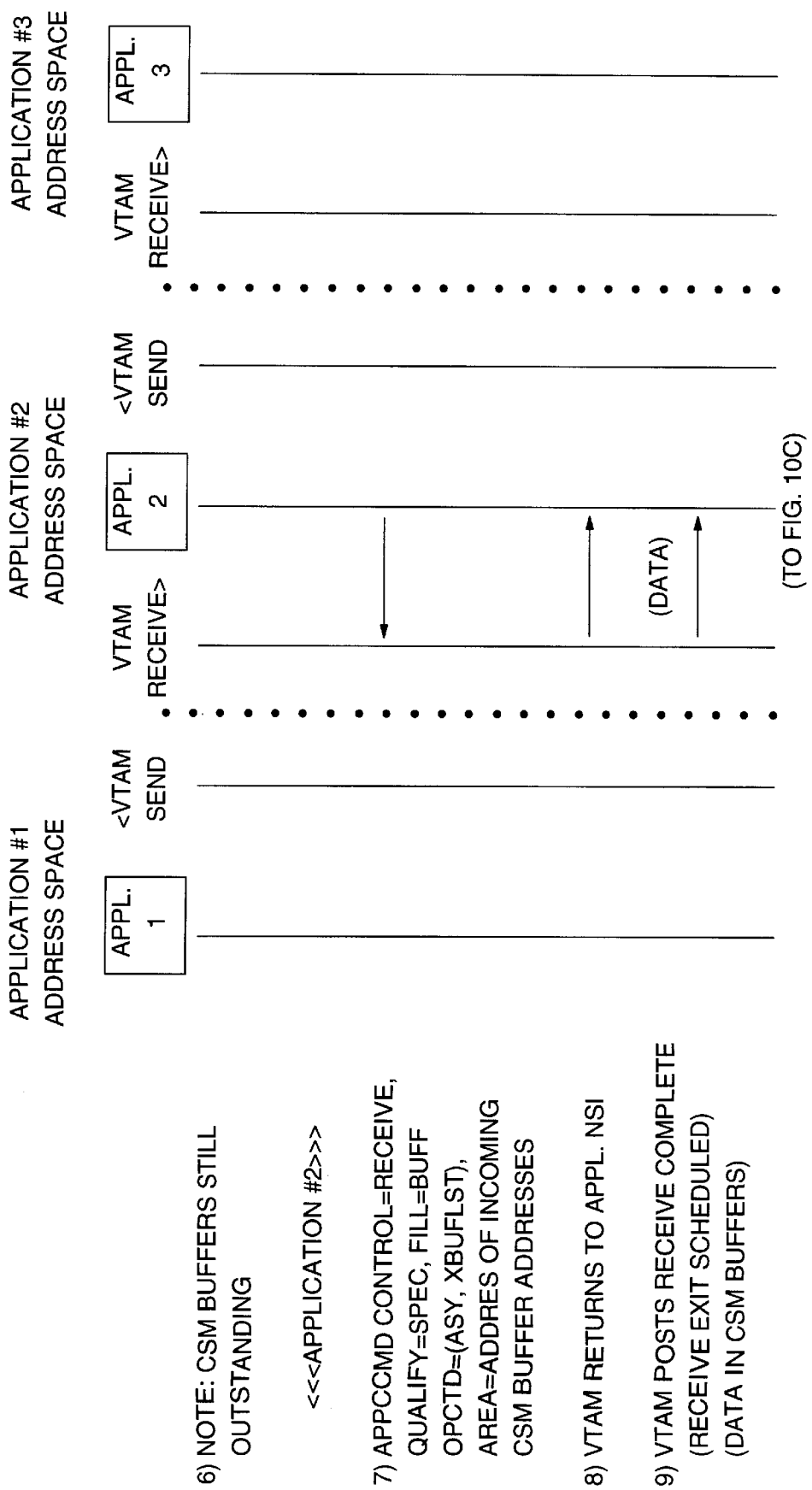
Figure 10D:
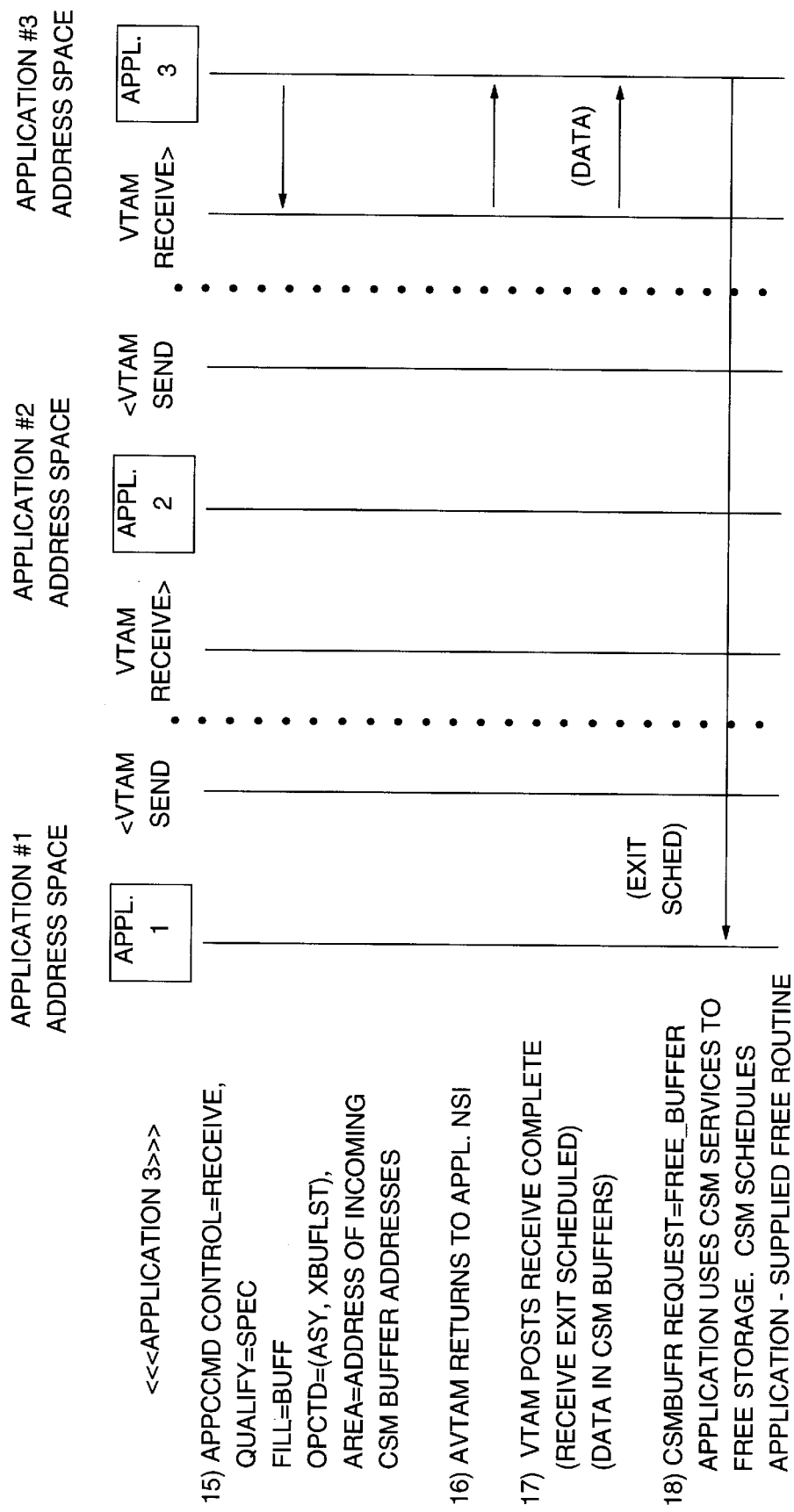

Referring to FIG. 9, a flowchart illustrating operation of the application in-bound data handler for processing large data objects using tokens will now be described. Execution of the application is started as a result of the communications manager having sent at 414 of FIG. 8 the token for the shared memory buffer to the application in-bound data handler routine. Processing of large data objects by the application in-bound data handler using tokens starts at 500. Upon starting, the application polls for in-bound data being stored in a shared memory buffer by the communications stack at 502. The application processes the data in the shared memory buffer at 504 and then returns ownership of the shared memory to the storage manager by passing a token as a parameter to the storage manager at 506. The steps of the application in-bound data manager routine at 504 and 506 correspond to Steps 4 and 5 of FIG. 7.

The storage manager then decrements the number of outstanding buffer tokens by one at 508. Thereafter, the storage manager determines at 510 whether the number of outstanding buffer tokens is equal to zero. If the storage manager determines that the number of outstanding buffer tokens equals zero, the storage manager returns the shared memory buffer to the pool of available buffers at 512, and the application continues to poll for in-bound data at 502. If the storage manager determines at 510 that the number of outstanding buffer tokens is not equal to zero, the application simply continues to poll for in-bound data at 502. The steps at blocks 508–512 of the flowchart of FIG. 9 correspond to Step 6 of FIG. 7.

In the alternative, the storage manager may return ownership of the buffer to the original requester as opposed to returning the buffer to the pool of available buffers. This is accomplished by allowing the original requester to specify a free routine to which the buffer will be returned when freed by all subsequent users (i.e., all other applications or domains). The storage manager keeps track of the original owner and all subsequent ownership changes as the buffer is passed from domain to domain. When the buffer is freed by the final receiving domain, the storage manager reassigns ownership of the buffer to the original requester before initializing the routine to free the buffer. This ownership tracking and return of the buffer to the original domain requesting the buffer is performed without the awareness of any intermediate domains using the buffer. The intermediate domains simply use the buffer and pass ownership of the buffer to the next domain. The final domain ultimately frees it using the same buffer free function that normally returns a buffer to the pool of available buffers to be reallocated. This function enables performance improvements in that the data can be used by all necessary parties without copying and ownership of the buffer is ultimately returned to the original requesting domain for further use by the original requesting domain. This alternative embodiment is illustrated in the example shown in FIGS. 10A–10D in which the ownership of the buffer is returned to the application that originally requested the buffer (i.e., Application 1).

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim:

1. A system for controlling the transmission of relatively large data objects among a plurality of domains in a communications system in which performance is optimized only for the efficient transmission of relatively small data objects between the plurality of domains, said controlling system comprising:

a plurality of buffers for storing relatively large data objects therein;

a plurality of domains, each of said domains representing an application capable of processing data, said plurality of domains comprising a first domain representing a first application capable of processing the relatively large data object stored in a first buffer of said plurality of buffers and a second domain representing a second application capable of processing the relatively large data object stored in the first buffer of said plurality of buffers; and ownership control means for assigning ownership of said first buffer having a relatively large data object stored therein to said first domain and for transmitting the first buffer having a relatively large data object stored therein from said first domain to said second domain without requiring physical movement of the relatively large data object stored in the first buffer and without requiring creation of a copy of the relatively large data object stored in the first buffer.

2. A system for controlling the transmission of relatively large data objects according to claim 1 wherein said ownership control means comprises:

first primary token means for representing the first buffer of said plurality of buffers;

first secondary token means for representing a first logical view of the first buffer of said plurality of buffers; and storage manager means for uniquely associating the first buffer with said first domain of said plurality of domains, for uniquely associating the first secondary token means with the first buffer of said plurality of buffers identified by the first primary token means and for uniquely associating the first secondary token means with the second domain of said plurality of domains.

3. A system for controlling the transmission of relatively large data objects according to claim 2 wherein said plurality of domains further comprises a third domain representing a third application capable of processing data stored in the first buffer, and said system further comprising:

second secondary token means for representing a second logical view of the first buffer of said plurality of buffers; and wherein said storage manager means further comprises means for associating the second secondary token means with the first buffer of said plurality of buffers identified by the first primary token means and for associating the second secondary token means with the third domain of said plurality of domains;

whereby the relatively large data object stored in the first buffer can be passed from the second domain to the third domain without requiring physical movement of the relatively large data object stored in the first buffer and without requiring creation of a copy of the large data object stored in the first buffer.

4. A system for controlling the transmission of relatively large data objects according to claim 2 wherein said storage manager means comprises:

means for accounting for the number of secondary token means associated with the first buffer of said plurality of buffers.

5. A system for controlling the transmission of relatively large data objects according to claim 4 further comprising a data processor on which said first domain processes said relatively large data objects stored in the first buffer of said plurality of buffers and on which said second domain processes said relatively large data objects stored in the first buffer of said plurality of buffers.

6. A system for controlling the transmission of relatively large data objects according to claim 5 wherein said storage manager further comprises means for disassociating the first secondary token means from the first buffer of said plurality of buffers identified by the first primary token upon completion of processing of said data in the first buffer of said plurality of buffers by said second domain on said data processor and for disassociating the first primary token means from the first buffer of said plurality of buffers identified by the first primary token upon completion of processing of said data in the first buffer of said plurality of buffers by said first domain on said data processor.

7. A system for controlling the transmission of relatively large data objects according to claim 6 wherein said storage manager further comprises:

means for reallocating the first buffer of said plurality of buffers upon disassociation of the first secondary token means from the first buffer of said plurality of buffers and the first primary token means from the first buffer of said plurality of buffers.

8. A system for controlling the transmission of relatively large data objects according to claim 1 wherein said ownership control means comprises:

primary token means for indicating ownership of the first buffer of said plurality of buffers;

storage manager means for uniquely associating the first buffer with said first domain of said plurality of domains using said primary token means to indicate that said first domain owns said first buffer, for disassociating the first buffer from said first domain using said primary token means upon completion of processing said data in said first buffer by said first domain, and for uniquely associating the first buffer with said second domain of said plurality of domains using said primary token means to indicate that said second domain owns said first buffer without requiring physical movement of the relatively large data object stored in the first buffer and without requiring creation of a copy of the relatively large data object stored in the first buffer.

9. A system for controlling the transmission of relatively large data objects according to claim 8 wherein said storage manager means further comprises:

means for disassociating the first buffer from said second domain using said primary token means upon completion of processing said data in said first buffer by said second domain.

10. A system for controlling the transmission of relatively large data objects according to claim 9 wherein said storage manager means further comprises:

means for reallocating the first buffer of said plurality of buffers upon disassociation of the primary token means from the first buffer after completion of processing said data in said first buffer by said second domain to indicate that said first buffer is available for use.

11. A system for controlling the transmission of relatively large data objects according to claim 9 wherein said storage manager means further comprises:

means for uniquely reassociating the first buffer with said first domain of said plurality of domains using said primary token means to indicate that said first domain owns said first buffer.

12. A system for controlling the transmission of relatively large data objects according to claim 1 wherein said communications system is a virtual telecommunications access method (VTAM) system.

13. A method for controlling the transmission of relatively large data objects among a plurality of domains, each of said domains representing an application capable of processing relatively large data objects, in a communications system in which performance is optimized only for the efficient transmission of relatively small data objects between the plurality of domains, the communications system having a plurality of buffers for storing relatively large data objects therein, said method comprising the steps of:

storing a relatively large data object in a first buffer of said plurality of buffers;

processing the relatively large data object stored in the first buffer of said plurality of buffers using a first domain of said plurality of domains and a second domain representing a second application capable of processing the relatively large data object stored in the first buffer of said plurality of buffers; and assigning ownership of said first buffer having a relatively large data object stored therein to a first domain of said plurality of domains;

transmitting the first buffer having a relatively large data object stored therein from said first domain to a second domain of said plurality of domains without requiring physical movement of the relatively large data object stored in the first buffer and without requiring creation of a copy of the relatively large data object stored in the first buffer; and processing the relatively large data object stored in the first buffer using a second domain of said plurality of domains.

14. A method for controlling the transmission of relatively large data objects according to claim 13 wherein said assigning step comprises the steps of:

generating a first primary token for representing the first buffer of said plurality of buffers and wherein said method further comprises the steps of:

generating a first secondary token for representing a first logical view of the first buffer of said plurality of buffers;

uniquely associating the first buffer with said first domain of said plurality of domains;

uniquely associating the first secondary token with the first buffer of said plurality of buffers identified by the first primary token; and uniquely associating the first secondary token with the second domain of said plurality of domains.

15. A method for controlling the transmission of relatively large data objects according to claim 14 further comprising the steps of:

generating a second secondary token for representing a second logical view of the first buffer of said plurality of buffers;

uniquely associating the second secondary token with the first buffer of said plurality of buffers identified by the first primary token; and associating the second secondary token with a third domain of said plurality of domains; and wherein said transmitting step comprises the step of:

passing the relatively large data object stored in the first buffer from the second domain to the third domain without requiring physical movement of the relatively large data object stored in the first buffer and without requiring creation of a copy of the large data object stored in the first buffer.

16. A method for controlling the transmission of relatively large data objects according to claim 14 wherein said transmitting step further comprises the step of:

accounting for the number of secondary tokens associated with the first buffer of said plurality of buffers.

17. A method for controlling the transmission of relatively large data objects according to claim 16 further comprising the steps of:

processing said relatively large data objects stored in the first buffer of said plurality of buffers using said first domain on a data processor; and processing said relatively large data objects stored in the first buffer of said plurality of buffers using said second domain on the data processor.

18. A method for controlling the transmission of relatively large data objects according to claim 17 wherein said transmitting step further comprises the steps of:

disassociating the first secondary token from the first buffer of said plurality of buffers identified by the first primary token upon completion of processing of said data in the first buffer of said plurality of buffers by said second domain on said data processor; and disassociating the first primary token from the first buffer of said plurality of buffers identified by the first primary token upon completion of processing of said data in the first buffer of said plurality of buffers by said first domain on said data processor.

19. A method for controlling the transmission of relatively large data objects according to claim 18 wherein said transmitting step further comprises the step of:

reallocating the first buffer of said plurality of buffers upon disassociation of the first secondary token from the first buffer of said plurality of buffers and the first primary token from the first buffer of said plurality of buffers.

20. A method for controlling the transmission of relatively large data objects according to claim 13 wherein said assigning step further comprises the steps of:

generating a primary token for indicating ownership of the first buffer of said plurality of buffers; and uniquely associating the first buffer with said first domain of said plurality of domains using said primary token to indicate that said first domain owns said first buffer; and wherein transmitting step comprises the steps of:

disassociating the first buffer from said first domain using said primary token upon completion of processing said data in said first buffer by said first domain; and uniquely associating the first buffer with said second domain of said plurality of domains using said primary token to indicate that said second domain owns said first buffer without requiring physical movement of the relatively large data object stored in the first buffer and without requiring creation of a copy of the relatively large data object stored in the first buffer.

21. A method for controlling the transmission of relatively large data objects according to claim 20 further comprising the step of:

disassociating the first buffer from said second domain using said primary token upon completion of processing said data in said first buffer by said second domain.

22. A method for controlling the transmission of relatively large data objects according to claim 21 further comprising the step of:

reallocating the first buffer of said plurality of buffers upon disassociation of the primary token from the first buffer after completion of processing said data in said first buffer by said second domain to indicate that said first buffer is available for use.

23. A method for controlling the transmission of relatively large data objects according to claim 21 further comprising the step of:

uniquely reassociating the first buffer with said first domain of said plurality of domains using said primary token to indicate that said first domain owns said first buffer.

24. A method for controlling the transmission of relatively large data objects according to claim 13 wherein said communications system is a virtual telecommunications access method (VTAM) system.

25. A computer program product for controlling the transmission of relatively large data objects in a communications system in which performance is optimized only for the efficient transmission of relatively small data objects, the communications system having a plurality of domains, each of said domains representing an application capable of processing relatively large data objects when executed on a processing unit, and a plurality of buffers for storing relatively large data objects therein, said computer program product comprising:

a computer readable storage medium having computer readable code means embodied in said medium, said computer readable code means comprising:

computer instruction means for storing a relatively large data object in a first buffer of said plurality of buffers;

computer instruction means for processing the relatively large data object stored in the first buffer of said plurality of buffers using a first domain of said plurality of domains and a second domain representing a second application capable of processing the relatively large data object stored in the first buffer of said plurality of buffers;

computer instruction means for assigning ownership of said first buffer having a relatively large data object stored therein to a first domain of said plurality of domains;

computer instruction means for transmitting the first buffer having a relatively large data object stored therein from said first domain to a second domain of said plurality of domains without requiring physical movement of the relatively large data object stored in the first buffer and without requiring creation of a copy of the relatively large data object stored in the first buffer; and computer instruction means for processing the relatively large data object stored in the first buffer using a second domain of said plurality of domains.

26. A computer program product for controlling the transmission of relatively large data objects according to claim 25 wherein said computer instruction means for assigning comprises:

computer instruction means for generating a first primary token for representing the first buffer of said plurality of buffers; and wherein said computer program product further comprises:

computer instruction means for generating a first secondary token for representing a first logical view of the first buffer of said plurality of buffers;

computer instruction means for uniquely associating the first buffer with said first domain of said plurality of domains;

computer instruction means for uniquely associating the first secondary token with the first buffer of said plurality of buffers identified by the first primary token; and computer instruction means for uniquely associating the first secondary token with the second domain of said plurality of domains.

27. A computer program product for controlling the transmission of relatively large data objects according to claim 26 further comprising:

computer instruction means for generating a second secondary token for representing a second logical view of the first buffer of said plurality of buffers;

computer instruction means for uniquely associating the second secondary token with the first buffer of said plurality of buffers identified by the first primary token; and computer instruction means for associating the second secondary token with a third domain of said plurality of domains; and wherein said computer instruction means for transmitting comprises:

computer instruction means for passing the relatively large data object stored in the first buffer from the second domain to the third domain without requiring physical movement of the relatively large data object stored in the first buffer and without requiring creation of a copy of the large data object stored in the first buffer.

28. A computer program product for controlling the transmission of relatively large data objects according to claim 26 wherein said computer instruction means for transmitting further comprises:

computer instruction means for accounting for the number of secondary tokens associated with the first buffer of said plurality of buffers.

29. A computer program product for controlling the transmission of relatively large data objects according to claim 28 further comprising:

computer instruction means for processing said relatively large data objects stored in the first buffer of said plurality of buffers using said first domain on a data processor; and computer instruction means for processing said relatively large data objects stored in the first buffer of said plurality of buffers using said second domain on the data processor.

30. A computer program product for controlling the transmission of relatively large data objects according to claim 29 wherein said computer instruction means for transmitting further comprises:

computer instruction means for disassociating the first secondary token from the first buffer of said plurality of buffers identified by the first primary token upon completion of processing of said data in the first buffer of said plurality of buffers by said second domain on said data processor; and computer instruction means for disassociating the first primary token from the first buffer of said plurality of buffers identified by the first primary token upon completion of processing of said data in the first buffer of said plurality of buffers by said first domain on said data processor.

31. A computer program product for controlling the transmission of relatively large data objects according to claim 30 wherein said computer instruction means for transmitting further comprises:

computer instruction means for reallocating the first buffer of said plurality of buffers upon disassociation of the first secondary token from the first buffer of said plurality of buffers and the first primary token from the first buffer of said plurality of buffers.

32. A computer program product for controlling the transmission of relatively large data objects according to claim 25 wherein said computer instruction means for assigning comprises:

computer instruction means for generating a primary token for indicating ownership of the first buffer of said plurality of buffers; and computer instruction means for uniquely associating the first buffer with said first domain of said plurality of domains using said primary token to indicate that said first domain owns said first buffer; and wherein computer instruction means for transmitting comprises:
  computer instruction means for disassociating the first buffer from said first domain using said primary token upon completion of processing said data in said first buffer by said first domain; and
  computer instruction means for uniquely associating the first buffer with said second domain of said plurality of domains using said primary token to indicate that said second domain owns said first buffer without requiring physical movement of the relatively large data object stored in the first buffer and without requiring creation of a copy of the relatively large data object stored in the first buffer.

33. A computer program product for controlling the transmission of relatively large data objects according to claim 32 further comprising:
  computer instruction means for disassociating the first buffer from said second domain using said primary token upon completion of processing said data in said first buffer by said second domain.

34. A computer program product for controlling the transmission of relatively large data objects according to claim 33 further comprising:
  computer instruction means for reallocating the first buffer of said plurality of buffers upon disassociation of the primary token from the first buffer after completion of processing said data in said first buffer by said second domain to indicate that said first buffer is available for use.

35. A computer program product for controlling the transmission of relatively large data objects according to claim 33 further comprising:
  computer instruction means for uniquely reassociating the first buffer with said first domain of said plurality of domains using said primary token to indicate that said first domain owns said first buffer.

36. A computer program product for controlling the transmission of relatively large data objects according to claim 25 wherein said communications system is a virtual telecommunications access method (VTAM) system.

* * * * *